J. L. & H. L. TARBOX.

STENCIL PLATE.

No. 6,753.

Reissued Nov. 16. 1875.

WITNESSES:

Jas. E. Hutchinson

John R. Young

INVENTORS:

J. L. and H. L. Tarbox, by

Prindle and Hopkins attorneys

N. PETERS, PHOTO-LITHOGRAPHER, WASHINGTON, D. C.

UNITED STATES PATENT OFFICE.

JEROME L. TARBOX AND H. L. TARBOX, OF NEW YORK, ASSIGNORS, BY MESNE ASSIGNMENTS, TO JOHN T. ANDREWS 2D, OF PENN YAN, N. Y.

IMPROVEMENT IN STENCIL-PLATES.

Specification forming part of Letters Patent No. 87,727, dated March 9, 1869; reissue No. 6,753, dated November 16, 1875; application filed October 21, 1875.

*To all whom it may concern:*

Be it known that JEROME L. TARBOX and H. L. TARBOX, of New York city, State of New York, did invent certain new and useful Improvements in Stencil-Plates, for which Letters Patent No. 87,727 were issued upon the 9th day of March, 1869, which Letters Patent have been found defective, in that the specification and claims do not cover and embrace all of the original invention, as set forth in the application filed in the Patent Office on the 26th day of January, 1869.

Now, therefore, being desirous of reissuing said Letters Patent, herewith surrendered, I have prepared, and do hereby declare that the following is a full, clear, and exact description of the said invention, reference being had to the accompanying drawings making a part of this specification, in which—

Figure 1:
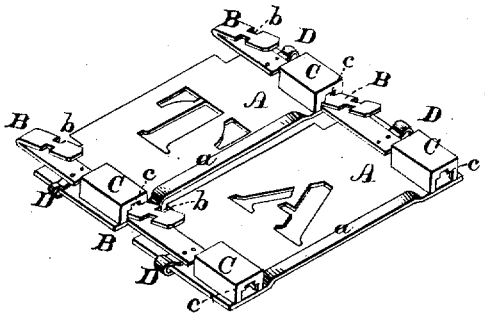
Figure 2:
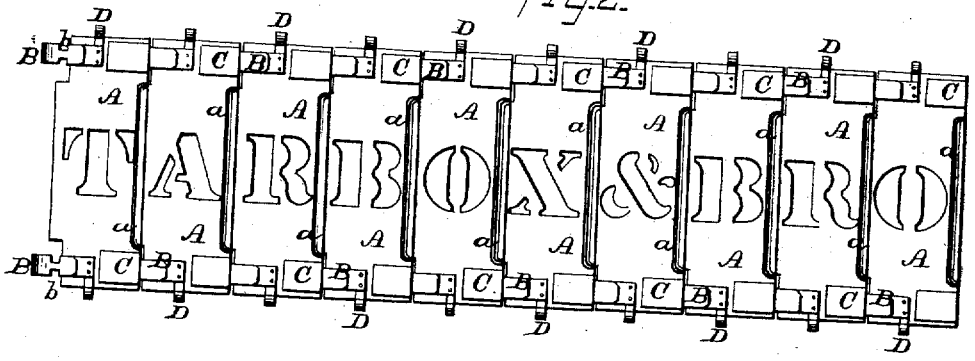

Figure 1 is a perspective view of two of said plates during the operation of connecting their edges together, and Fig. 2 is a plan view of the same after connection.

Letters of like name and kind refer to like parts in each of the figures.

The design of this invention is to enable a stencil-plate, for printing any desired word or words, to be easily and quickly formed from separate plates, which contain each a single letter or character, without the use of frames, or other equivalent devices, for holding the latter when combined; and to this end it consists, principally, in stencil-letters capable of being connected or disconnected at their edges, so as to form a continuous stencil-plate, substantially as and for the purpose hereinafter specified. It consists, further, in stencil-plates capable of being connected at their edges, substantially as and for the purpose hereinafter shown. It consists, further, in stencil plates or letters so constructed that, when combined, their contiguous edges shall overlap, substantially as and for the purpose hereinafter set forth. It consists, finally, in the especial means employed for connecting together the contiguous edges of the stencil plates or letters, substantially as and for the purpose hereinafter shown and described.

In the annexed drawings, A and A represent sheet-metal plates, which have, preferably, a rectangular form in plan view, and each contains within its central portion a letter or character for use in the ordinary manner. One edge, *a*, of each plate A is raised, so as to form a rabbet, which receives and contains the contiguous edge of the adjacent plate, and prevents ink from passing between the same when in use. To each end of each plate A is attached a bent spring-catch, B, which projects beyond one edge of said plate, and may be caused to engage with a housing, C, that is secured to or upon the contiguous edge of another plate, A, and is so constructed interiorly as to enable it to receive and contain said spring. The opening within each housing for the reception of its spring has, laterally, such dimensions as to enable the latter to enter freely; but, vertically, said opening has less height than said spring when the latter is fully entered, and, consequently, compresses the same in such direction. Within the upper side of the spring-opening of each housing is provided a notch, *c*. The contiguous portion of the upper leaf of the spring B is cut away upon each side, so as to form a neck, *b*, that corresponds to said notch, and fits into the same at the instant when said spring has passed inward to its farthest limit, by which means the shoulders at the outer side of said neck are caused to engage with the inner side of said housing upon each side of said notch, and prevent the separation of said parts. To connect the plates thus constructed the spring-catches of one are caused to enter the housings of another plate, and are then pressed inward until they engage therewith. To disconnect said plates the upper arm of each spring is pressed downward until released from engagement with their housings, when they may be easily withdrawn. If desired, for the purpose of forming curved lines of the plates, each spring B may be provided with two or more necks, *b*, so as to enable the plates to be locked together with their edges separated more or less at either end, while in contact at their opposite ends.

By means of the construction shown, or other equivalent construction of the engaging edges of the letter-plates, a stencil-plate of any required length may be formed, which will possess all the requisites of a plate formed of one piece of metal, and may be used without inclosing-frames, or any similar means usually employed for the purpose of holding in relative position detached letters. When it is desired to connect together two or more stencil-plates, a loop, D, is provided upon each end of each letter-plate A, and said stencil-plates then placed with their edges in contact, after which a rod is passed through said loop, and through the loops of the adjacent letter-plates, and binds said parts firmly together.

While the devices described are, preferably, employed for connecting together the letter and stencil plates, other arrangement of engaging mechanism may be used without departure from the spirit of this invention.

Having thus fully set forth the nature and merits of this invention, what is claimed as new is—

1. Stencil-letters constructed and adapted to be connected or disconnected at their edges, so as to form a continuous stencil-plate, substantially as and for the purpose specified.

2. Stencil-plates constructed and adapted to be connected at their edges, substantially as and for the purpose shown.

3. Stencil plates or letters, as above described and claimed, capable of being combined, and having their contiguous edges constructed so as to overlap, substantially as and for the purpose set forth.

4. In combination with the letter-plates A and A, the spring-catches B *b* and the housings C *c*, substantially as and for the purpose shown and described.

5. In combination with the plates A and A, the loops D and D, secured upon and extending outward from their edges, substantially as and for the purpose specified.

In testimony whereof I have hereunto set my hand this 15th day of October, 1875.

JOHN T. ANDREWS 2D.

Witnesses:
A. ANDREWS,
M. MCEVOY.